United States Patent [19]

Kitamura et al.

[11] Patent Number: 5,668,896

[45] Date of Patent: Sep. 16, 1997

[54] METHOD OF AND APPARATUS FOR PROCESSING IMAGE HAVING A PLURALITY OF IMAGE AREAS

[75] Inventors: Hideaki Kitamura; Katsuya Yamaguchi; Hiroshi Shibazaki, all of Kyoto, Japan

[73] Assignee: Dainippon Screen Mfg. Co., Ltd., Japan

[21] Appl. No.: 654,024

[22] Filed: May 28, 1996

Related U.S. Application Data

[63] Continuation of Ser. No. 6,206, Jan. 19, 1993, abandoned, which is a continuation of Ser. No. 586,133, Sep. 21, 1990, abandoned.

[30] Foreign Application Priority Data

Sep. 21, 1989 [JP] Japan ................ 1-245985
Jan. 8, 1990 [JP] Japan ................. 2-2175

[51] Int. Cl.⁶ ........................................ G06K 9/00
[52] U.S. Cl. ............................ 382/282; 382/162
[58] Field of Search ........................ 382/164, 162, 382/282, 309; 358/453, 538

[56] References Cited

U.S. PATENT DOCUMENTS

| | | | |
|---|---|---|---|
| 4,183,013 | 1/1980 | Agrawala | 382/26 |
| 4,538,182 | 8/1985 | Saito et al. | 382/17 |
| 4,718,090 | 1/1988 | Cooper, Jr. | 382/26 |
| 4,868,884 | 9/1989 | Miyazaki et al. | 382/30 |
| 4,972,496 | 11/1990 | Sklarew | 382/13 |
| 5,038,383 | 8/1991 | Usumoto et al. | 382/33 |
| 5,140,650 | 8/1992 | Casey | 382/61 |

FOREIGN PATENT DOCUMENTS

| | | | |
|---|---|---|---|
| 0278528 | 8/1988 | European Pat. Off. | G06F 15/72 |
| 0280320 | 8/1988 | European Pat. Off. | G01F 15/68 |

OTHER PUBLICATIONS

W.M. Sproull et al. "Principles of Interactive Computer Graphics", McGraw–Hill, 1979; Chapters 10 Picture Sturcture, 12 Graphical Input Techniques and 17 Interactive Raster Graphics.

European Search Report for EP 90 11 8134.

*Primary Examiner*—Yon J. Couso
*Attorney, Agent, or Firm*—Ostrolenk, Faber, Gerb & Soffen, LLP

[57] ABSTRACT

An image is read by an image reader and displayed on a color display. A segment (S) (or other graphic) is designated on the displayed image. Areas which overlap the segment and which have a designated color are specified as objective areas. The colors of the objective areas are changed to a newly designated color.

6 Claims, 18 Drawing Sheets

FIG. 3F

SCT$_2$

| N$_s$ | N$_d$ |
|---|---|
| 1 | 0 |
| 2 | 3 |
| 3 | 0 |
| 4 | 3 |
| 5 | 0 |
| 6 | 0 |
| 7 | 1 |

FIG. 3D

SCT$_1$

| N$_s$ | N$_d$ |
|---|---|
| 1 | 0 |
| 2 | 1 |
| 3 | 0 |
| 4 | 1 |
| 5 | 0 |
| 6 | 0 |
| 7 | 1 |

FIG. 3E

SCT$_{1a}$

| N$_s$ | N$_d$ |
|---|---|
| 1 | 0 |
| 2 | 3 |
| 3 | 0 |
| 4 | 1 |
| 5 | 0 |
| 6 | 0 |
| 7 | 1 |

FIG. 6E

IST

| Ns(2) = Ns(4) |
| --- |
| Ns(5) = Ns(6) |

FIG. 6C

| 1 | 1 | 1 | 1 | 1 | 1 | 1 | 1 | 1 |
|---|---|---|---|---|---|---|---|---|
| 2 | 1 | 1 | 1 | 1 | 1 | 1 | 1 | 1 |
| 2 | 2 | 1 | 1 | 1 | 1 | 1 | 1 | 1 |
| 3 | 2 | 2 | 2 | 2 | 1 | 1 | 1 | 1 |
| 3 | 3 | 2 | 2 | 2 | 2 | 1 | 1 | 1 |
| 3 | 3 | 2 | 2 | 2 | 2 | 2 | 1 | 1 |
| 3 | 4 | 2 | 6 | 6 | 2 | 2 | 2 | 1 |
| 4 | 4 | 2 | 6 | 6 | 6 | 2 | 2 | 2 |
| 5 | 5 | 5 | 5 | 5 | 5 | 5 | 2 | 2 |

FIG. 6D

| 1 | 1 | 1 | 1 | 1 | 1 | 1 | 1 | 1 |
|---|---|---|---|---|---|---|---|---|
| 2 | 1 | 1 | 1 | 1 | 1 | 1 | 1 | 1 |
| 2 | 2 | 1 | 1 | 1 | 1 | 1 | 1 | 1 |
| 3 | 2 | 2 | 2 | 2 | 1 | 1 | 1 | 1 |
| 3 | 3 | 2 | 2 | 2 | 2 | 1 | 1 | 1 |
| 3 | 3 | 2 | 2 | 2 | 2 | 2 | 1 | 1 |
| 3 | 2 | 2 | 5 | 5 | 2 | 2 | 2 | 1 |
| 2 | 2 | 2 | 5 | 5 | 5 | 2 | 2 | 2 |
| 5 | 5 | 5 | 5 | 5 | 5 | 5 | 2 | 2 |

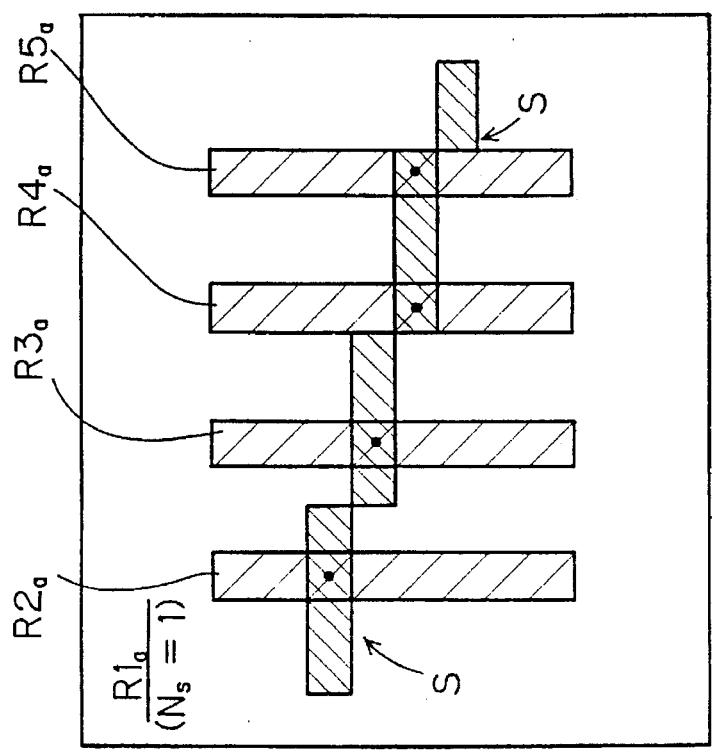

FIG. 9A
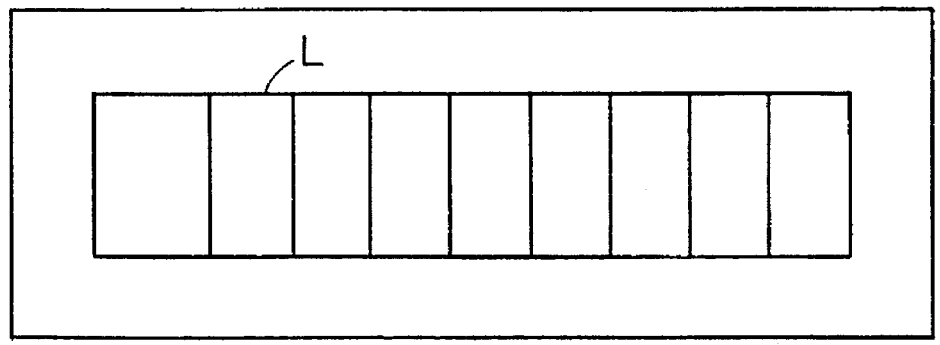
FIG. 9B
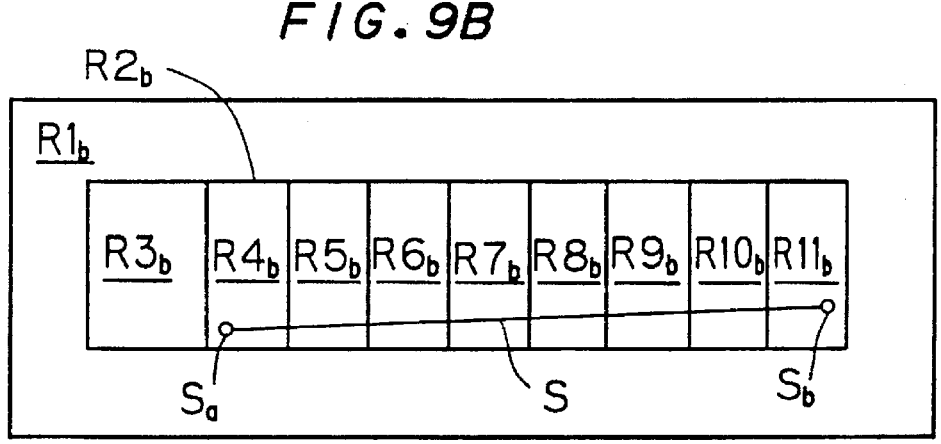
FIG. 9C
SCT₅
| $N_s$ | $N_d$ |
|---|---|
| 1 | 0 |
| 2 | 1 |
| 3 | 0 |
| 4 | 0 |
| 5 | 0 |
| 6 | 0 |
| 7 | 0 |
| 8 | 0 |
| 9 | 0 |
| 10 | 0 |
| 11 | 0 |
FIG. 9D
SCT₆
| $N_s$ | $N_d$ |
|---|---|
| 1 | 0 |
| 2 | 1 |
| 3 | 3 |
| 4 | 3 |
| 5 | 3 |
| 6 | 3 |
| 7 | 3 |
| 8 | 3 |
| 9 | 3 |
| 10 | 3 |
| 11 | 3 |

SCT$_8$

| N$_s$ | N$_d$ |
|---|---|
| 1 | 0 |
| 3 | 1 |
| 7 | 1 |
| 14 | 1 |

SCT$_7$

| N$_s$ | N$_d$ |
|---|---|
| 1 | 0 |
| 2 | 1 |
| 3 | 1 |
| 4 | 1 |
| 5 | 1 |
| 6 | 1 |
| 7 | 1 |
| 8 | 0 |
| 9 | 1 |
| 10 | 1 |
| 11 | 0 |
| 12 | 1 |
| 13 | 1 |
| 14 | 1 |
| 15 | 1 |
| 16 | 1 |
| 17 | 1 |
| 18 | 0 |

FIG. 14F

| 0 | Ns1 | 0 |
|---|-----|---|
| 1 | Ns3 | 110 |
| 0 | Ns1 | 140 |
| 0 | —   | 300 |

FIG. 14G

| 0 | Ns1 | 0 |
|---|-----|---|
| 1 | Ns11 | 180 |
| 0 | Ns1 | 260 |
| 0 | —   | 300 |

FIG. 14H

| 0 | Ns1 | 0 |
|---|-----|---|
| 1 | Ns3 | 110 |
| 0 | Ns1 | 140 |
| 1 | Ns11 | 180 |
| 0 | Ns1 | 260 |
| 0 | —   | 300 |

FIG. 14D

| Dwb | Dsc | Drc |
|-----|-----|-----|
| 0 | Ns1 | 0 |
| 1 | Ns2 | 30 |
| 0 | Ns1 | 40 |
| 1 | Ns3 | 110 |
| 0 | Ns1 | 140 |
| 1 | Ns11 | 180 |
| 0 | Ns1 | 260 |
| 0 | —   | 300 |

FIG. 14E

| 0 | Ns1 | 0 | * |
|---|-----|---|---|
| 0 | Ns1 | 30 | * |
| 0 | Ns1 | 40 | * |
| 1 | Ns3 | 110 | |
| 0 | Ns1 | 140 | * |
| 0 | Ns1 | 180 | * |
| 0 | Ns1 | 260 | * |
| 0 | —   | 300 | |

METHOD OF AND APPARATUS FOR PROCESSING IMAGE HAVING A PLURALITY OF IMAGE AREAS

This is a continuation of application Ser. No. 08/006,206 filed on Jan. 19, 1993, now abandoned which is a continuation of parent application Ser. No. 07/586,133 filed on Aug. 21, 1990, now abandoned.

BACKGROUND OF THE INVENTION

1. Field of the Invention

The present invention relates to a method of and an apparatus for selectively performing image processing, such as selectively coloring a part of an image, such as an image formed of letters and graphics.

2. Description of Prior Art

To print catalogs or leaflets, image processing is often carried out to assign various colors to letters and graphics or to thicken the letters. Prior to such image processing, designated letters, illustrations, logos and graphics are arranged on a base sheet to make a layout copy and the sheet is read by an image reader to obtain a binary image. The coloring process is then selectively applied to part of the binary image, e.g., to areas occupied by the letters or the graphics.

However, when there are a lot of designated areas to which the image processing is to be applied, the processing is complicated and takes a long time. This is because an operator has to determine the designated areas one by one.

SUMMARY OF THE INVENTION

The present invention is directed to a method of selectively processing designated areas of an image.

In the present application, the word "color" is used in a broad sense, and includes white and black.

Accordingly, an object of the present invention is to selectively process areas of an image at a high speed.

Another object is to assign colors to the areas at a high speed.

Another object is to extract closed areas from an image at a high speed.

Thus, the present invention relates to a method of processing an image, including the steps of: (A) designating an objective color; (B) designating a graphic on an image; (C) determining objective areas which are overlapped by the graphic and which have the objective color; and (D) applying an image procedure to areas-to-be-processed, the areas-to-be-processed being: (1) the objective areas or (2) all of the image except for the objective areas.

The present invention also relates to an apparatus which includes: (A) means for assigning initial colors to image areas of an image; (B) display means for displaying the image to create a displayed image; (C) means for designating one of the initial colors as an objective color; (D) means for designating a graphic on the displayed image; (E) means for determining objective areas which are overlapped by the graphic and which have the objective color; and (F) means for applying an image procedure to areas-to-be-processed, the areas-to-be-processed being: (1) the objective areas or (2) all of the image areas other than the objective areas.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 3A–3F illustrate details of operation of the image processor;

FIGS. 6A–6E illustrate area dividing processing;

FIGS. 8A–8C, 9A–9D and 10 illustrate the processing of other images;

FIGS. 14A–14H illustrate other examples of the second embodiment; and

DETAILED DESCRIPTION OF THE PREFERRED EMBODIMENTS

A. Construction of Image Processor

Figure 1:
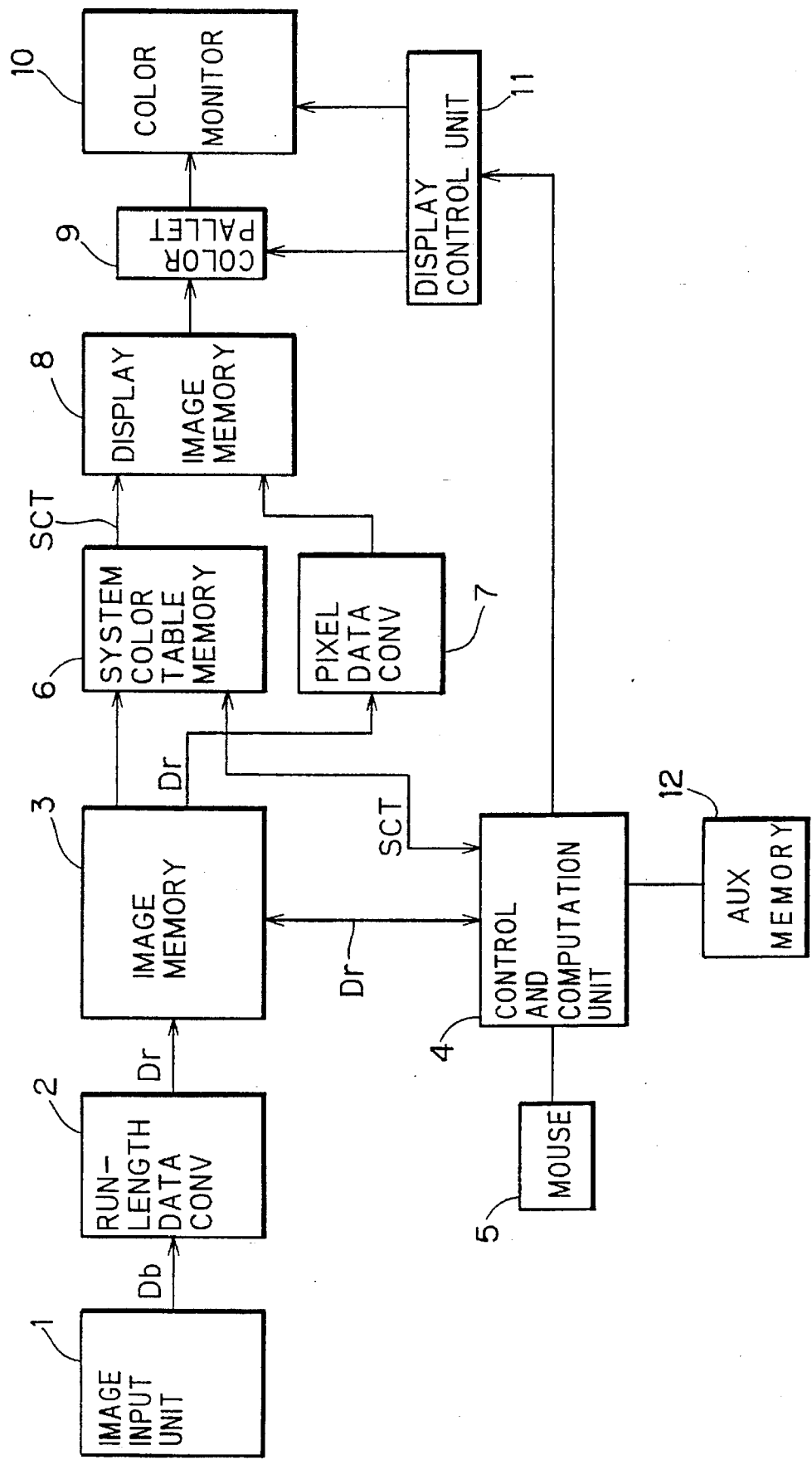
FIG. 1 is a block diagram of an image processor according to a first preferred embodiment of the present invention.

FIG. 1 is a block diagram of an image processor according to a preferred embodiment of the present invention. The image processor can be used to color areas of an image. The image processor includes the following elements:

- (a) Image input unit 1: reads a layout copy made on a base sheet and thereby obtains a binary image. The unit 1 may include a flat type scanner.
- (b) Run length data converter 2: converts the binary image into run length data.
- (c) Image memory 3: stores the run length data.
- (d) Control and computation unit 4: controls the image processor and carries out predetermined computations.
- (e) Mouse 5: used by an operator to designate areas and to input other instructions. A stylus pen, etc. may be used instead of the mouse.
- (f) System color table memory 6: stores data expressing colors of closed areas of the image.
- (g) Pixel data converter 7: converts the run length data into image data.
- (h) Display image memory 8: stores the image data.
- (i) Color pallet 9: transforms the image data into component density signals of R (red), G (green) and B (blue).
- (j) Color monitor CRT 10: displays color images.
- (k) Display control unit 11: controls the color monitor 10.
- (l) Auxiliary memory 12: temporarily stores the coordinate values of intersecting points.

B. Coloring

Figure 2:
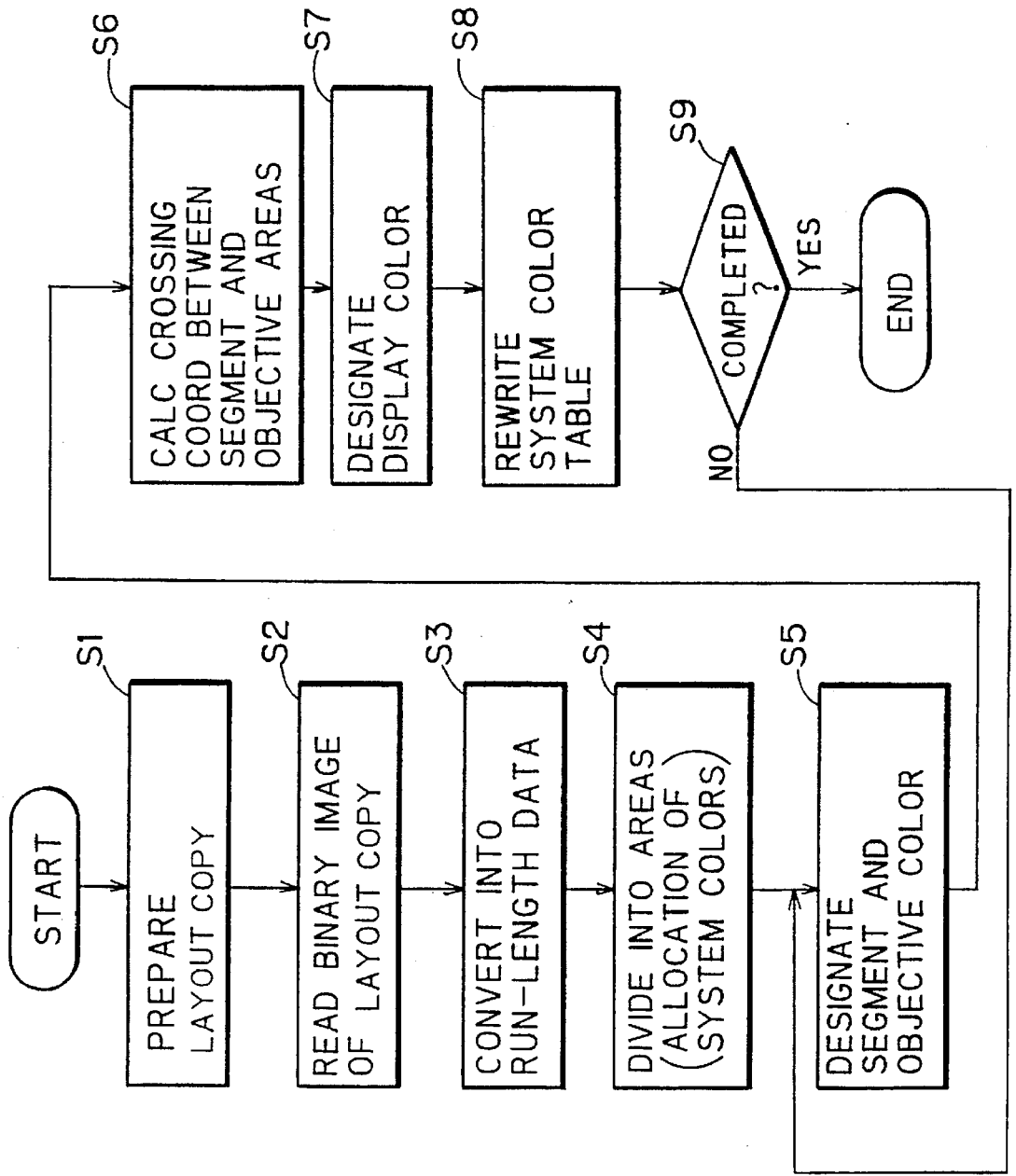
FIG. 2 is a flow chart for the first embodiment.
Figure 3A:
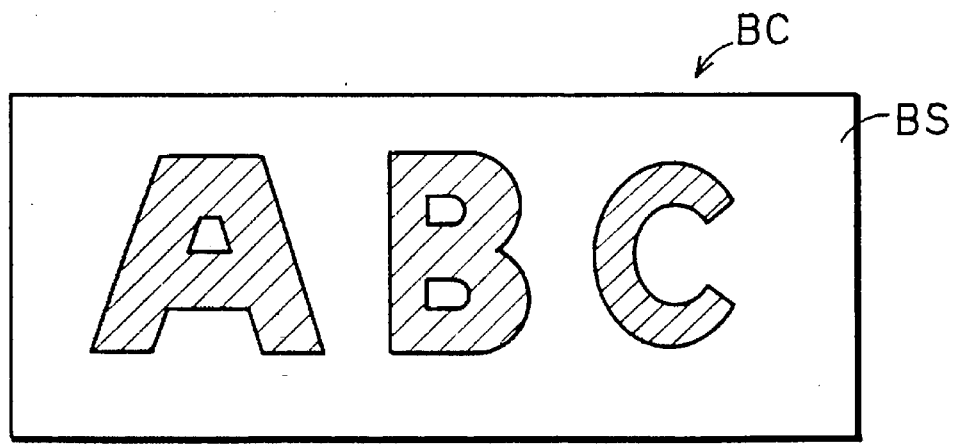

FIG. 2 is a flow chart of the coloring procedure. The object of the coloring procedure is to uniformly fill designated areas with specified colors. First, a layout copy is prepared (step 1) by arranging letters and graphics on a base sheet. An example of such a layout copy BC is illustrated in FIG. 3A. The layout copy BC includes a base sheet BS, with letters A, B and C. The letters are depicted in black. The layout copy BC is photoelectrically read by the image input unit 1 (step S2), whereby binary image data $D_b$ is obtained. The data $D_b$ expresses, for each pixel, whether the image at that pixel is black or white.

Figure 4A:
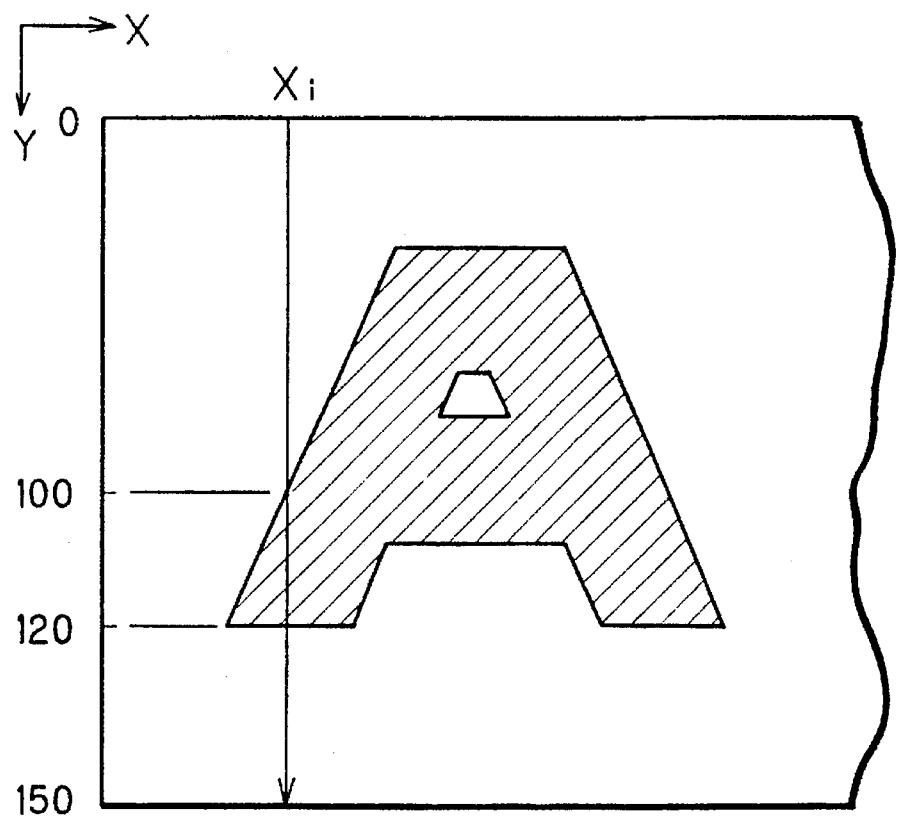
FIGS. 4A and 4B illustrate the composition of run length data.
Figure 4B:
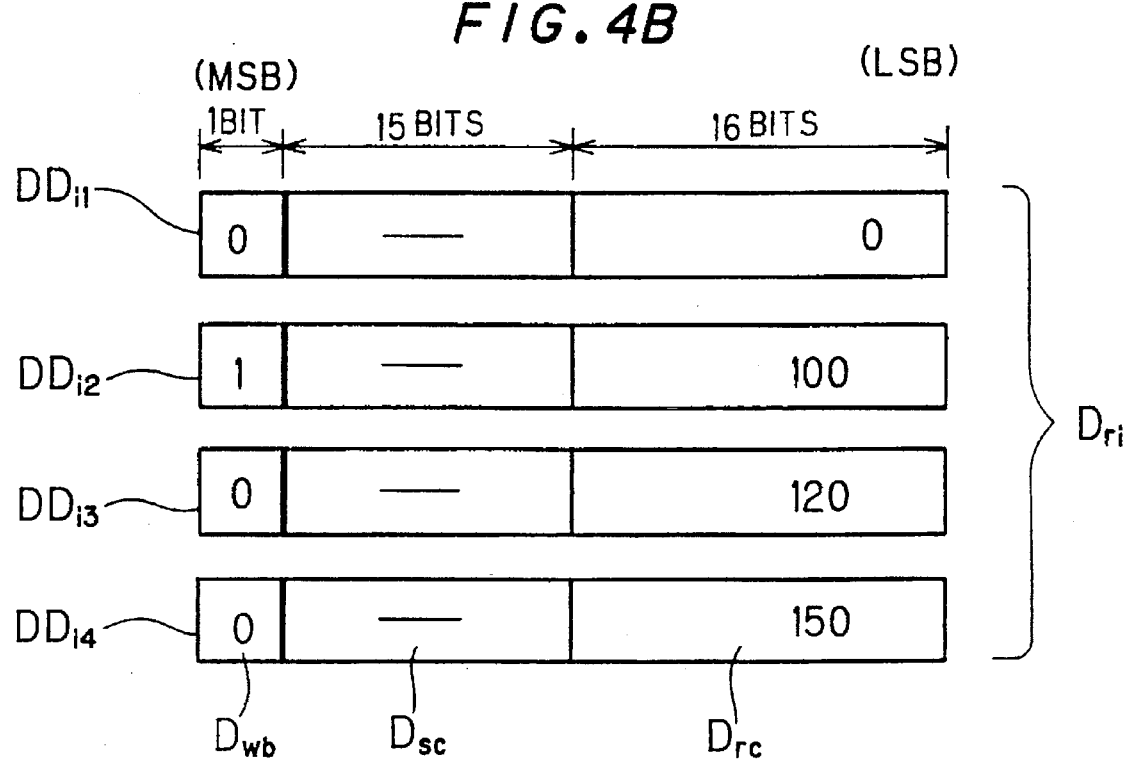

The data $D_b$ is then supplied from the unit 1 to the run length transformer 2 and is there transformed into run length data $D_r$ (step S3). FIGS. 4A and 4B show the composition of the run length data $D_r$. In particular, FIG. 4A shows an enlarged view of the portion of the layout copy which includes the letter A. In FIG. 4A, the main and subscanning directions are indicated by Y and X, respectively, and the range of the main scanning coordinate Y on the base sheet is from 0 to 150.

FIG. 4B shows the run length data $D_{ri}$ for subscanning coordinate $x_i$. The data $D_{ri}$ are composed of four consecutive unit run length data $DD_{i1}$–$DD_{i4}$. Each of the unit run length data includes 32 bits, the most significant bit being white-black specifying data $D_{wb}$, which indicates whether the corresponding unit run length data expresses white or black. The following 15 bits are system color data $D_{sc}$ for expressing a system color number (described later). The least significant 16 bits are coordinate data $D_{rc}$ for expressing the main scanning coordinate of the starting point of the corresponding unit run length. Thus, along the subscanning coordinate $x_i$, the main scanning coordinates y from 0 through 99 are for white, ones from 100 through 119 are for black and ones from 120 through 150 are for white. Three unit run length data $DD_{i1}$–$DD_{i3}$ express the main scanning coordinates of the starting points for the above three sections and their colors (white or black). The value of the main scanning coordinate of the fourth unit run length data $DD_{i4}$ is the maximum one (=150), expressing termination of the run length data on the main scanning line. At this time, since system colors have not been specified, the system color data $D_{sc}$ are left meaningless. The run length data $D_r$ thus obtained is supplied to and stored in the image memory 3.

In the step S4, the control and computation unit 4 uses the run length data $D_r$ to divide the layout copy image into closed areas and to assign different system color numbers $N_s$ to each area.

Figure 3B:
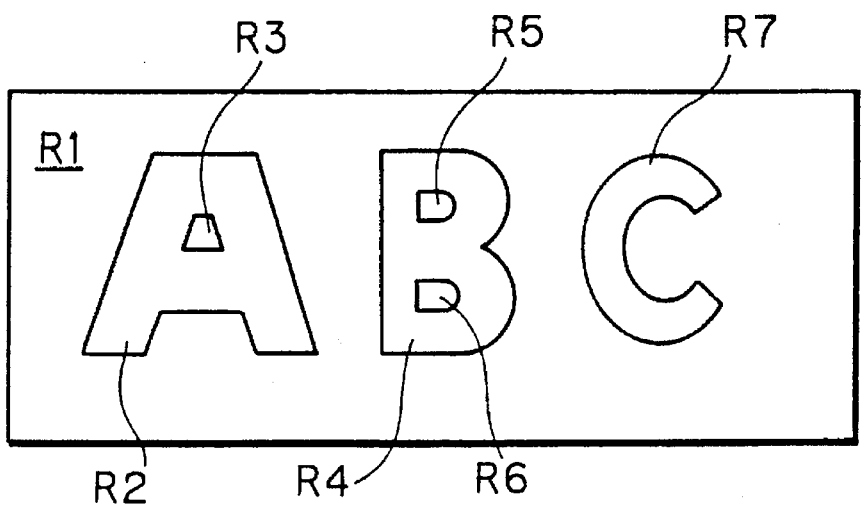

In the example illustrated in FIG. 3B, there are seven separate areas R1–R7, and seven system color numbers $N_s$=1–7 are assigned, respectively, to the seven areas R1–R7. The numbers are called system color numbers because they are assigned automatically by the control and computation unit 4 and because they can be used to express color. Thus, by assigning different system color numbers to the areas R1–R7, the areas R1–R7 can be displayed on the monitor 10 in different colors.

Figure 5:
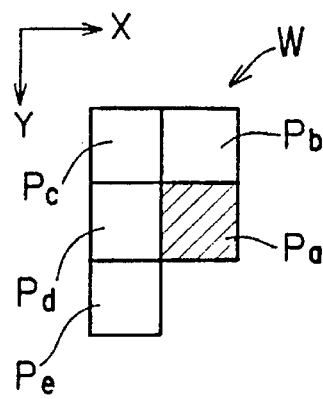
FIG. 5 is a plan view of a processing window for area dividing processing.

FIG. 5 shows a processing window W which is used in the area division processing. The hatched pixel P is an objective pixel. The other pixels $P_b$–$P_e$ partially surround the pixel $P_a$. The processing window W is moved in sequence along the main scanning direction Y in an ascending order of the subscanning coordinate X. If the pixel $P_a$ is black and if all of the surrounding pixels $P_b$–$P_e$ are white, then a new system color number $N_s$ is assigned to the pixel $P_a$. On the other hand, if at least one of the surrounding pixels $P_b$–$P_e$ is black, then the system color number $N_s$ already assigned to the surrounding black pixels is assigned to the pixel $P_a$. The same is true in the case where the objective pixel $P_a$ is white. However, in this case, when only the pixels $P_c$ and $P_e$ (which adjoin the pixel $P_a$ in a skew direction) are white, a system number $N_s$ which is different from those for the pixels $P_c$ and $P_e$ is assigned to the objective pixel $P_a$. In this way, when white pixels adjoin the objective white pixel $P_a$ only in a skew direction, it is recognized that these pixels belong to different areas, whereby undesirable area division to cross the monoblack and monowhite areas can be avoided.

Figure 6A:
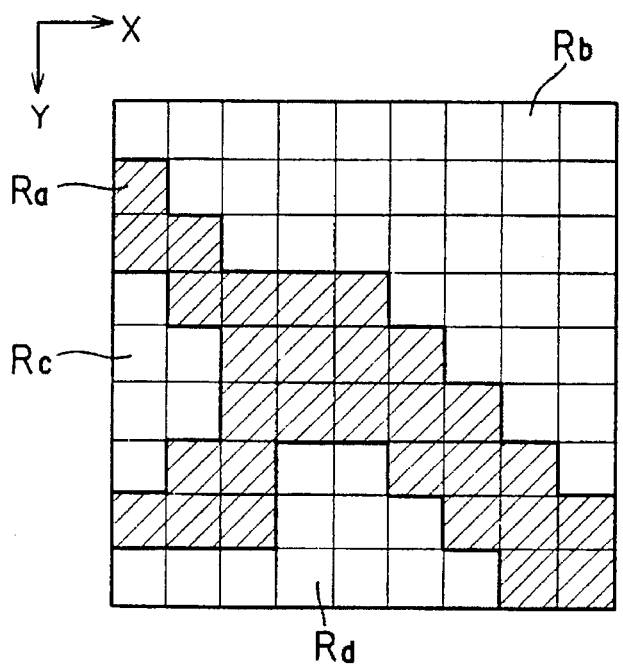

In the course of moving the processing window W and sequentially assigning different system color numbers to different areas, two or more system color numbers $N_s$ may be assigned to the same area. FIGS. 6A and 6E explain what happens in such cases. In the example illustrated in FIG. 6A, the layout copy image is composed of a black area $R_a$ and three white areas $R_b$, $R_c$ and $R_d$, and the white areas are separated from each other by the black area $R_a$.

Figure 6B:
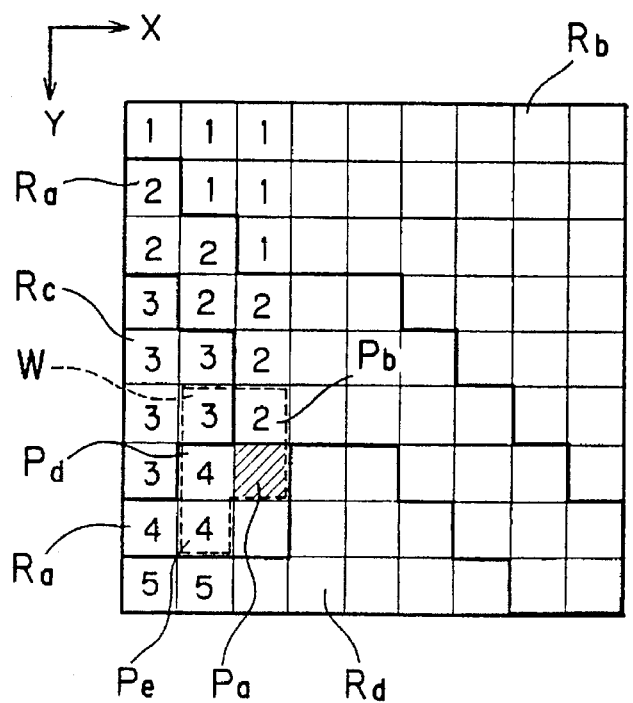

As the processing window W is moved in sequence along the main scanning direction Y, different system color numbers $N_s$ are assigned to the areas $R_a$–$R_d$. In FIG. 6B, the numerals in pixels show the system color numbers $N_s$ assigned to such pixels. Pixels without numerals are pixels to which system color numbers $N_s$ have not yet been assigned. Pixels which have been assigned system color number $N_s$=2 and pixels which have been assigned system color number $N_s$=4 exist in the black area $R_a$. When the processing window W comes to the position shown in FIG. 6B, the pixel $P_b$ has the system color number $N_s$=2 and the pixels $P_d$ and $P_e$ have the number $N_s$=4. In this case, information expressing that "the system color numbers $N_s$=2 and $N_s$=4 represent a system color" is temporarily stored in the auxiliary memory 12 and $N_s$=2 (which is the smaller of the two system color numbers) is assigned to the objective pixel $P_a$.

If this is carried out for all of the pixels in FIG. 6A, the system color image shown in FIG. 6C and an identical system color table IST shown in FIG. 6E are obtained. The identical system color table IST represents that the system color numbers $N_s$=2 and $N_s$=4 express the same system color number (i.e., have been assigned to pixels which are in the same image area). Similarly, the table IST represents that the system color numbers $N_s$=4 have been assigned to pixels which are in the same system color. The identical system color table IST is stored in the auxiliary memory 12.

Then, with reference to the identical system color table IST stored in the auxiliary memory 12, a common system color number (for example, the smallest system color number in each row of the table IST) is reassigned to the pixels of each of the common image areas. As a result, the image shown in FIG. 6D is obtained, in which each of the areas $R_a$–$R_d$ has a different color number $N_s$.

Although the processing is conducted on respective pixels according to the preferred embodiment, the same may be conducted on the image data compressed in the run length as shown in FIGS. 4A and 4B.

In this way, the areas $R_1$–$R_7$ of the layout copy image illustrated in FIG. 3A are identified and, for each such area, a single system color number $N_s$ is allocated to each of the pixels in that area. For example, the system color numbers $N_s$=1–7 are sequentially assigned to the areas $R_1$–$R_7$, respectively.

The system color numbers $N_s$ thus obtained become the system color data $D_{sc}$ of the run length data $D_r$ (FIG. 4B). Then, the run length data $D_r$ is supplied to and stored in the image memory 3.

The control and computation unit 4 generates a system color table expressing correspondence between the system color numbers $N_s$ and display colors (black or white in this case) and the system color table is stored in the system color table memory 6. FIG. 3D shows the system color table $SCT_1$. The system color table $SCT_1$ is composed of the system color numbers $N_s$ and the display color numbers $N_d$. $N_d$=0 indicates white, while $N_d$=1 indicates black.

In step S5, an operator specifies objective areas by designating a "designation graphic", in this case a segment S on the layout copy image. More particularly, the layout copy image is first displayed on the color monitor 10. Since the display color numbers $N_d$ on the system color table $SCT_1$ are only $N_d=1$ (black) and $N_d=0$ (white) (FIG. 3D), the image displayed on the monitor is monochromatic. In an alternative embodiment, the image may be displayed chromatically by using the system color numbers $N_s$.

Figure 3C:
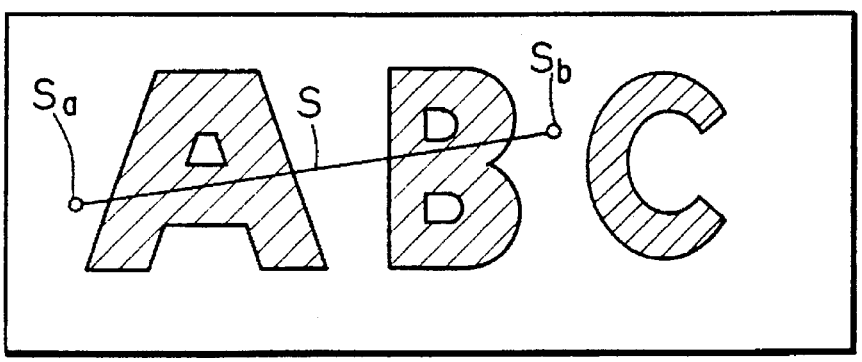

Then, the operator watches the monitor 10 and uses the mouse 5 to designate the positions of the end points $S_a$ and $S_b$ of the segment S (FIG. 3C). In FIG. 3C, the end points $S_a$ and $S_b$ are expressed with hollow circles. In actuality, they may be indicated by the symbol "x".

The operator also designates that black areas are to be the objective areas. This designation may be made by using the mouse 5 to select from a menu which allows for the selection of either white or black. This menu may be displayed on the color monitor 10. By designating that black areas are to be the objective areas, the areas R2 and R4, which belong to the group of black areas R2, R4 and R7, and which are crossed by the segment S, are designated to be objective areas.

Figure 7:
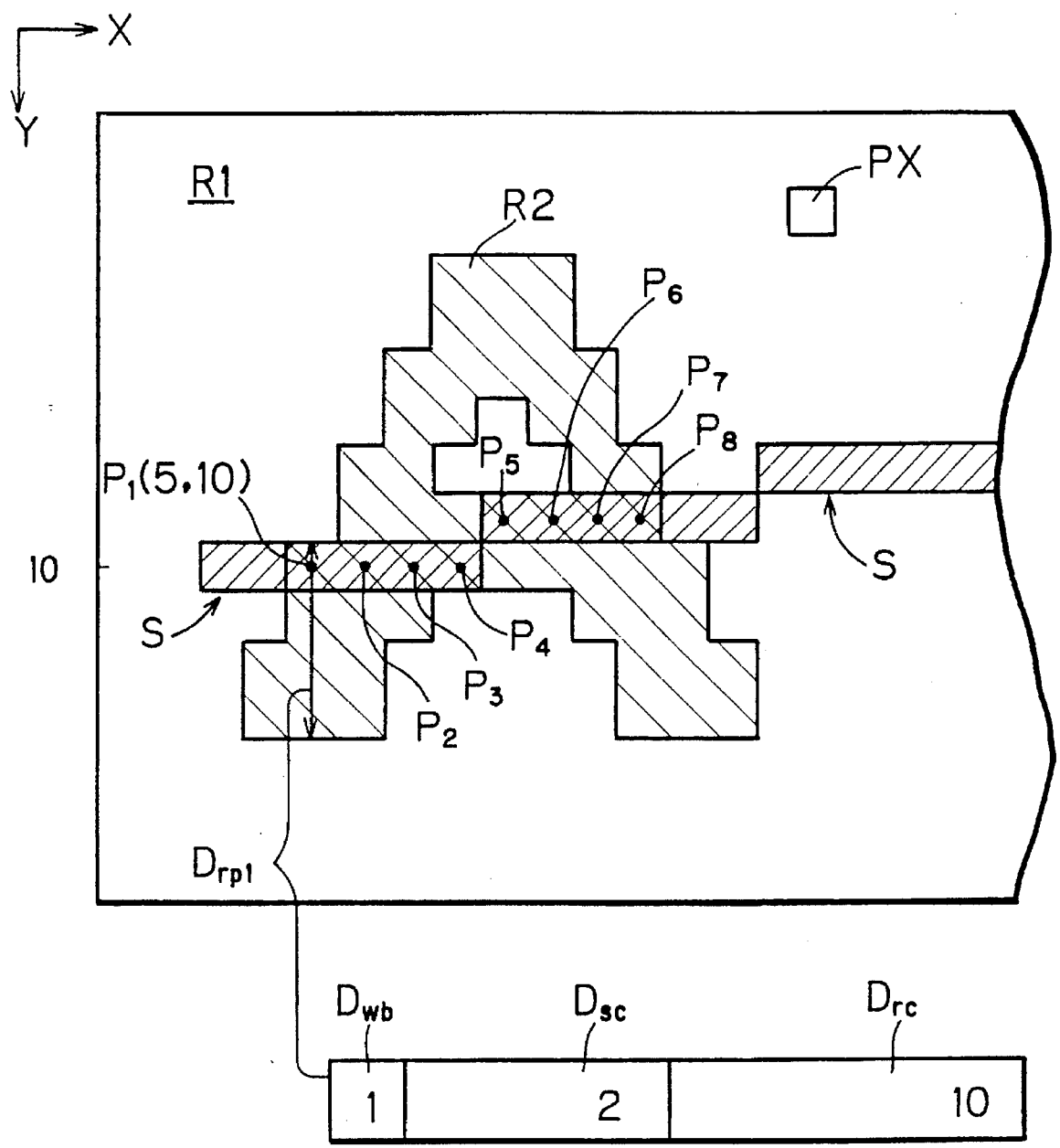
FIG. 7 illustrates crossing points.

In step S6, the control and computation unit 4 computes the coordinates of the points at which the segment S crosses the black areas. In FIG. 7, each pixel PX of the letter A is represented by a square and the segment S crosses the letter A at eight crossing points $P_1$–$P_8$. The control and computation unit 4 computes the coordinate values of the crossing points $P_1$–$P_8$ and the coordinate values are stored in the auxiliary memory 12.

In step S7, the operator designates a display color (for example, red) for the designated areas ($R_2$ and $R_4$). This may be carried out by displaying a display color menu on the color monitor 10 and by selecting one of the colors within the menu.

Then, in step S8, the control and computation unit 4 rewrites the corresponding display color numbers $N_d$ in the system color table $SCT_1$ (which is stored in the system color table memory 6). In particular, the control and computation unit 4 obtains the unit run length data $D_{rp1}$ for the crossing point $P_1$ (shown at the bottom of FIG. 7). (The data $D_{rp1}$ is obtained from the image memory 3.) Since the crossing point $P_1$ belongs to the area $R_2$, the value of the system color data $D_{sc}$ within the unit run length data $D_{rp1}$ is "2". The control and computation unit 4 then rewrites the system color table $SCT_1$ (FIG. 3D), such that the display color number $N_d=1$ is changed to $N_d=3$, wherein $N_d=3$ corresponds to red. That is, the value of the display color number $N_d=1$ corresponding to the system color number $N_s=2$ is changed to "3". FIG. 3E shows the system color table $SCT_{1a}$ thus rewritten. This procedure is repeated for the crossing points $P_2$–$P_8$ and also for the points at which the segment S crosses the letter B. As a result, the system color table $SCT_2$ shown in FIG. 3F is obtained, in which the display color number $N_d$ for the areas $R_2$ and $R_4$ is changed to the display color number $N_d=3$ (red). The system color table $SCT_2$ thus rewritten is stored in the system color table memory 6.

In step S9, a determination is made as to whether there is any other area to be colored. If there is, then the process returns to step S5. If there is no other area to be colored, then the process is completed.

In the process described above, the areas $R_2$ and $R_4$ (which correspond to the letters A and B) can be designated by simply designating the end points $S_a$, $S_b$ of a segment S which passes through the areas $R_2$ and $R_4$. Thus, advantageously, letters and graphics can be easily designated even if they are arranged in a direction which is inclined with respect to the scanning directions.

Further, in step S8, the system color table shown in FIG. 3E is obtained (rewriting system color table), even if only the crossing points $P_2$–$P_8$ (among the eight crossing points $P_1$–$P_8$) are subjected to the process. This is because the crossing points $P_2$–$P_8$ and the point $P_1$ are in the same area $R_2$. Thus, step S8 need not be carried out for all of the crossing points. When the minimum width of the image areas is known, step S8 may be carried out by inputting (with a keyboard, not shown) the minimum width of the image areas and selecting the crossing points one by one for every minimum width of the image areas.

For example, referring to FIG. 7, if the minimum width of the image areas is the width of two pixels, step S8 may be carried out for the crossing points $P_1$, $P_3$, $P_5$ and $P_7$. However, when the width of the black areas $R2_a$–$R5_a$ is only one pixel (as is the case with the layout copy image shown in FIG. 8A), then step S8 must be performed for all of the crossing points. FIG. 8B shows the system color table $SCT_3$ (before rewriting) for the layout copy shown in FIG. 8A, and FIG. 8C shows the system color table $SCT_4$ after such rewriting.

In another modification for further simplifying the process, not only the coordinate values of the crossing points $P_1$–$P_8$ (obtained in step S6), but also the system color numbers corresponding to the points $P_1$–$P_8$ are stored in the auxiliary memory 12. After storing all of the crossing points, crossing points which have the same system color number are deleted, such that only one crossing point coordinate value is left (for example, in FIG. 7, only $P_1$ is left and $P_2$–$P_8$ are deleted). Through this process, only one coordinate value remains for each objective area to which one system color number is given, so that processing efficiency is improved.

Colored images are displayed on the color monitor 10 as follows. First, the run length data $D_r$ stored in the image memory 3 are supplied to the pixel data transformer 7, and are there transformed to image data for each pixel. Since the run length data $D_r$ contain no more than the system color data $D_{sc}$ (FIG. 4B) as data to express colors, the transformed image data supplied to the image memory 8 also contain the system color data, i.e., system color numbers, as the data to express colors. On the other hand, the contents of the system color table memory SCT are supplied to the display image memory 8 from the system color table memory 6. That is, the data showing correspondence between the system color number $N_s$ and the display color number $N_d$ are transmitted to the display image memory 8. As a result, the image data expressing the display color number $N_d$ for each pixel is stored in the memory 8. When the image data stored in the memory 8 is delivered to the color pallet 9, the pallet 9 generates color signals R, G and B for each pixel as a function of the display color number $N_d$ for each pixel. These color signals are supplied to the color monitor 10.

FIGS. 9A–9E illustrate the coloring process as applied to an image which has a table defined by keylines. The layout copy image shown in FIG. 9A consists of black lines L on a white background. Through the area-division process, the layout copy image is divided into eleven areas $R1_b$–$R11_b$ (FIG. 9B). The area $R2_b$ includes all of the keylines L. FIG. 9C shows the system color table $SCT_3$ obtained through the area division processing. The system color numbers $N_s=1$–$11$ are assigned to the areas $R1_b$–$R11_b$.

When the areas $R1_b$–$R11_b$ are to be changed from white to red, the end points $S_a$ and $S_b$ of the segment S are designated (step S5) such that they are within the areas $R4_b$ and $R11_b$, and the white areas are designated to be objective. As a result, the areas $R4_b$–$R11_b$ are designated to be objective areas. The other steps are carried out similarly as above. As a result, as shown in FIG. 9D, the system color table $SCT_6$ is obtained, in which the display color number $N_d$ for the areas $R4_b$–$R11_b$ is changed to "3" (for red).

Figure 10:
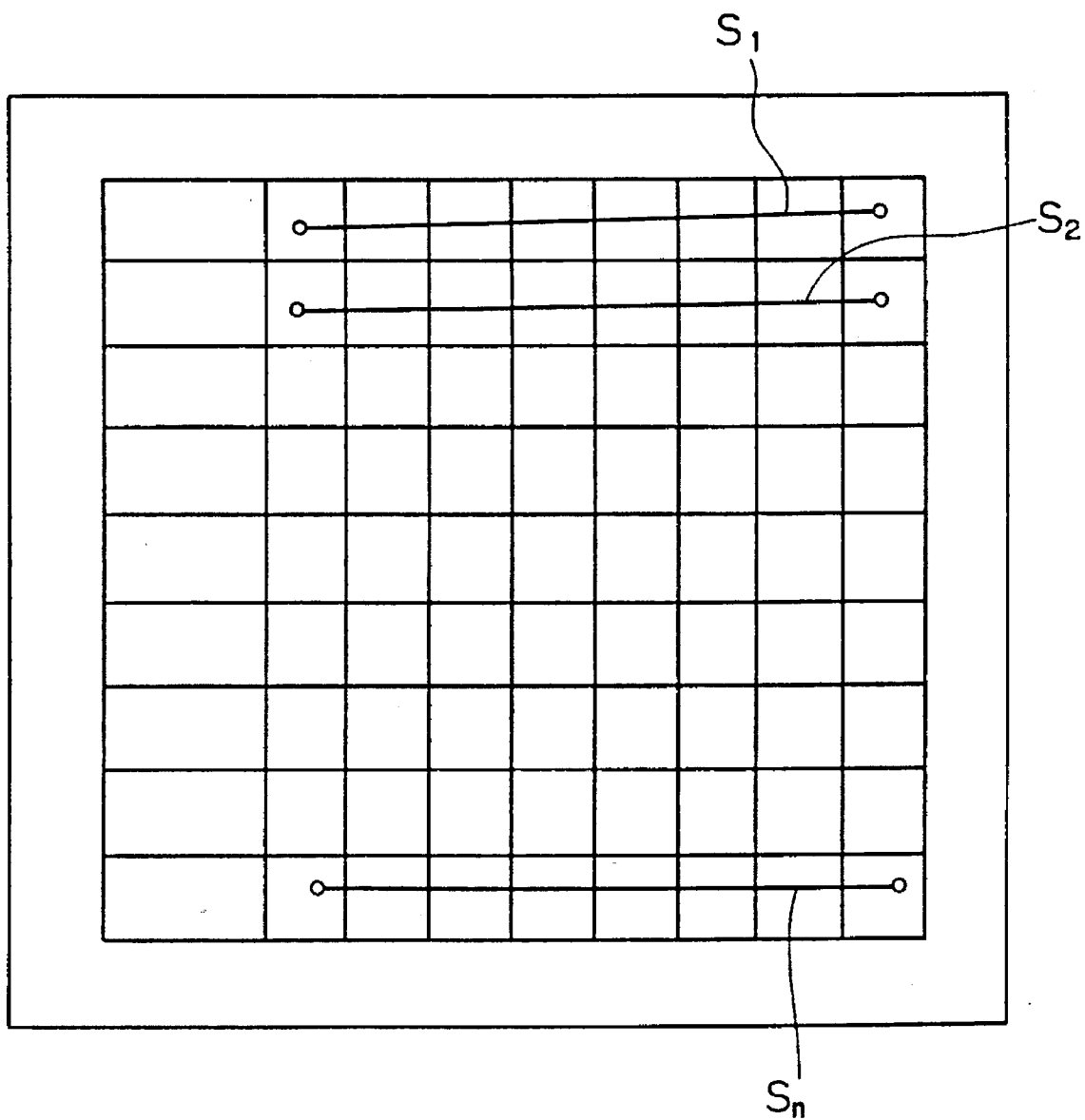

FIG. 10 shows a layout copy image having a table with n rows (n being a positive integer). The rows in the table can be colored with different colors by simply designating segments $S_1$–$S_n$ such that the segments $S_1$–$S_n$ pass through the rows to be colored.

C. Extraction of Image Areas

Next, a process of extracting designated areas from a layout copy image according to another preferred embodiment of the present invention will be described. Image extracting is used to remove minute pinholes contained in the layout copy image and the like. Image extracting can be thought of as a method of uniformly filling non-designated areas with a specified color (here, white). It can also be thought of as a method of extracting partial images containing only the designated areas as the substantial images.

Figure 11:
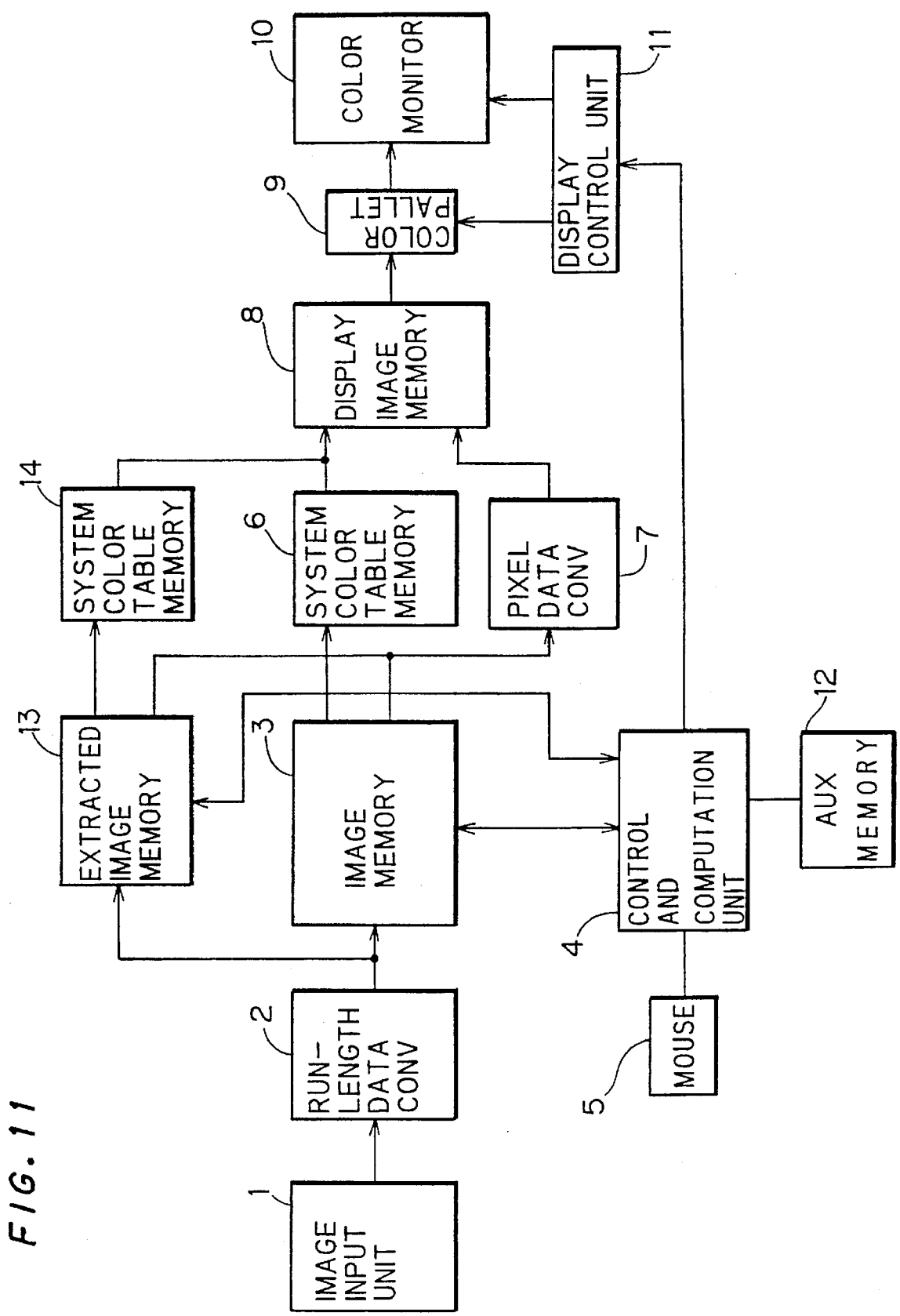
FIG. 11 is a block diagram of an image processor according to a second preferred embodiment of the present invention.

FIG. 11 is a block diagram of an image processor for image extracting. The processor is like the processor illustrated in FIG. 1, but also has an extracted image memory 13 and a system color table memory 14. The extracted image memory 13 stores run length data for an extracted image. The system color table memory 14 stores the system color table for the extracted image.

Figure 12:
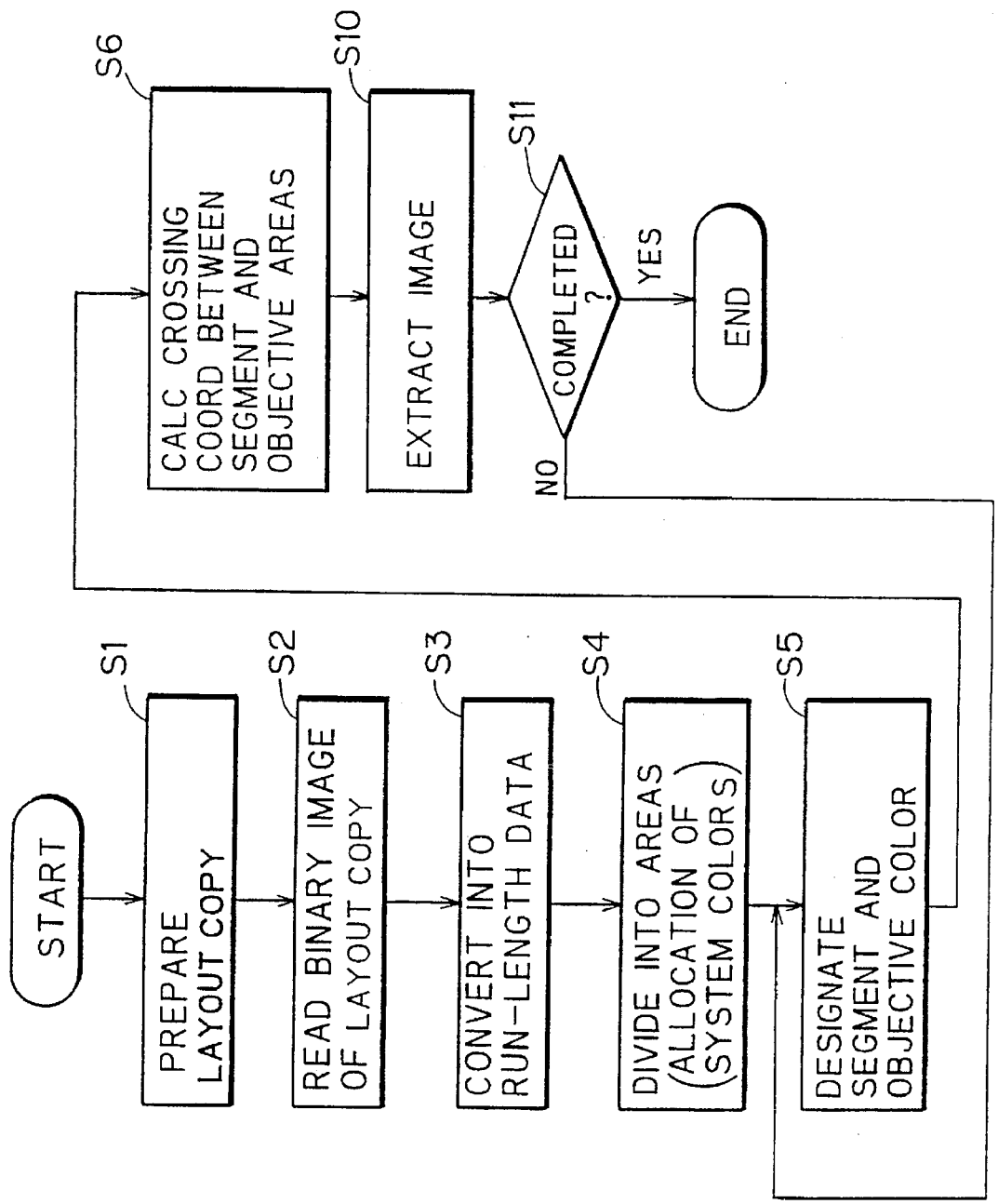
FIG. 12 is a flow chart for the second embodiment.

FIG. 12 is a flow chart of the image extracting process. Steps S1–S6 are the same as those in FIG. 2.

Figure 13A:
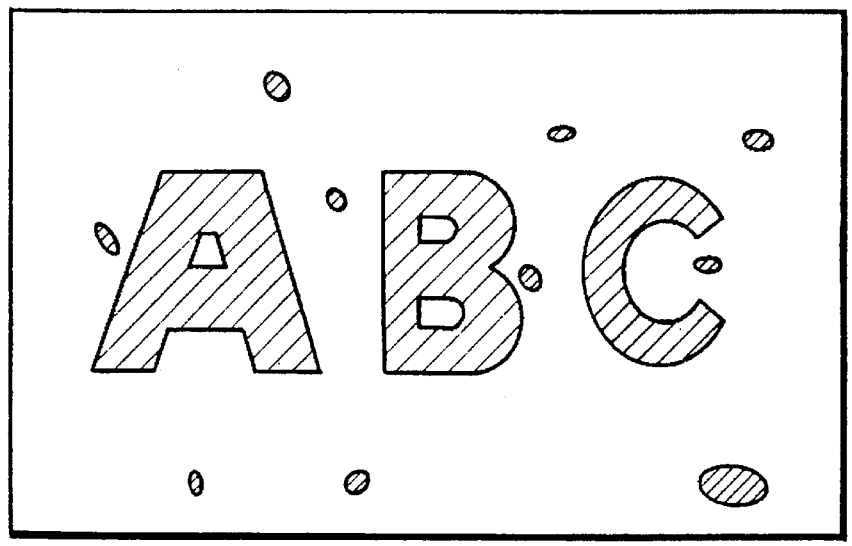
FIGS. 13A–13E illustrate details of the second embodiment.

FIG. 13A is a plan view of a layout copy image which is read in step S2. There are many minute black pinholes on this layout copy image. The run length data for this image are stored in the image memory 3. By extracting only the image of the black areas (i.e., the letters A, B and C), the pinholes can be removed from the layout copy image.

Figure 13B:
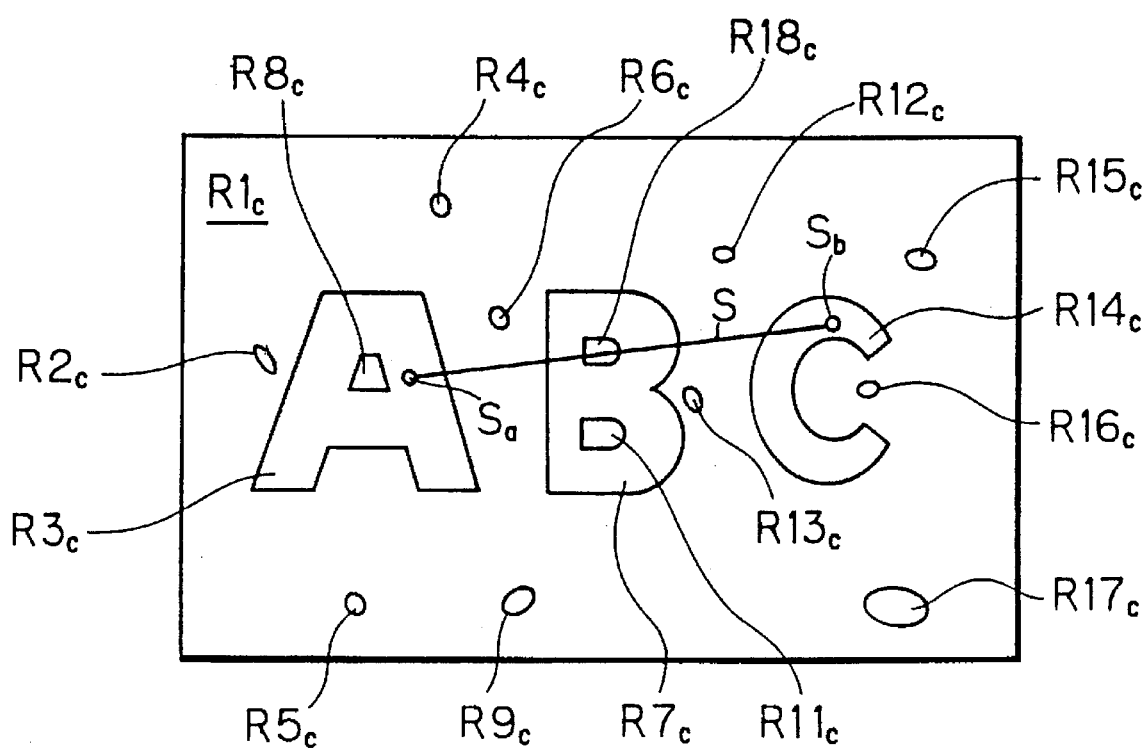
Figures 13C, 13D, 13E:
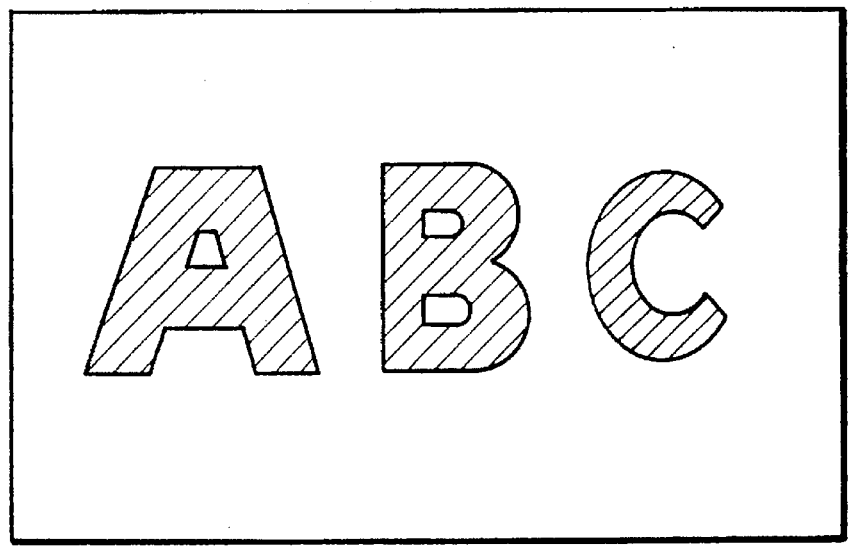

In step 4, the image is divided into 17 areas, as illustrated in FIG. 13B. An area $R1_c$ corresponds to the white background and the areas $R3_c$, $R7_c$ and $R14_c$ correspond to the letters A, B and C (i.e., the black areas), respectively. Each pinhole is recognized as an individual area. FIG. 13D shows a system color table $SCT_7$ obtained during step 4. The areas $R1_c$–$R18_c$ are assigned system color numbers $N_s$=1–18, respectively. The display color number $N_d$ for the background area $R1_c$ is "0" (white), while the display color number $N_d$ for the other areas is "1" (black).

By designating the segment S in step S5 such that it passes through the areas $R3_c$, $R7_c$ and $R14_c$ but not through the pinhole areas, as depicted in FIG. 13B, the areas $R3_c$, $R7_c$ and $R14_c$ (the letters A, B and C) can be extracted without extracting the pinhole areas.

In step S6, the coordinate values of the points at which the segment S crosses the designated areas are computed, as in the color assignment process.

Next, in step S10, the extraction of an image is carried out. To begin with, only the unit run length data for the crossing points obtained in step S6 are selected from the run length stored in the image memory 3. Then, the non-selected unit run length data are corrected such that they all express white areas. That is, the values of the black/white designation data $D_{wb}$ included in the non-selected unit run length data are forced to "0". Besides, the value of the system color data $D_{sc}$ included in the unit run length data is forced to "1", which is the same value of the system color data as the white background. When two or more unit run length data expressing white become adjacent to each other, they may be united to one unit run length data. The above processing is carried out by the control and computation unit 4.

The run length data thus corrected express, as shown in FIG. 13C, an image which includes the white background and the black letters A, B and C, but which does not include the pinholes. The corrected run length data is supplied to the extracted image memory 13 from the control and computation unit 4 and is stored therein. The corrected run length data is used to generate a system color table $SCT_8$ for the extracted image, as illustrated in FIG. 13E, and this table $SCT_8$ is stored in the system color table memory 14.

Figure 14A:
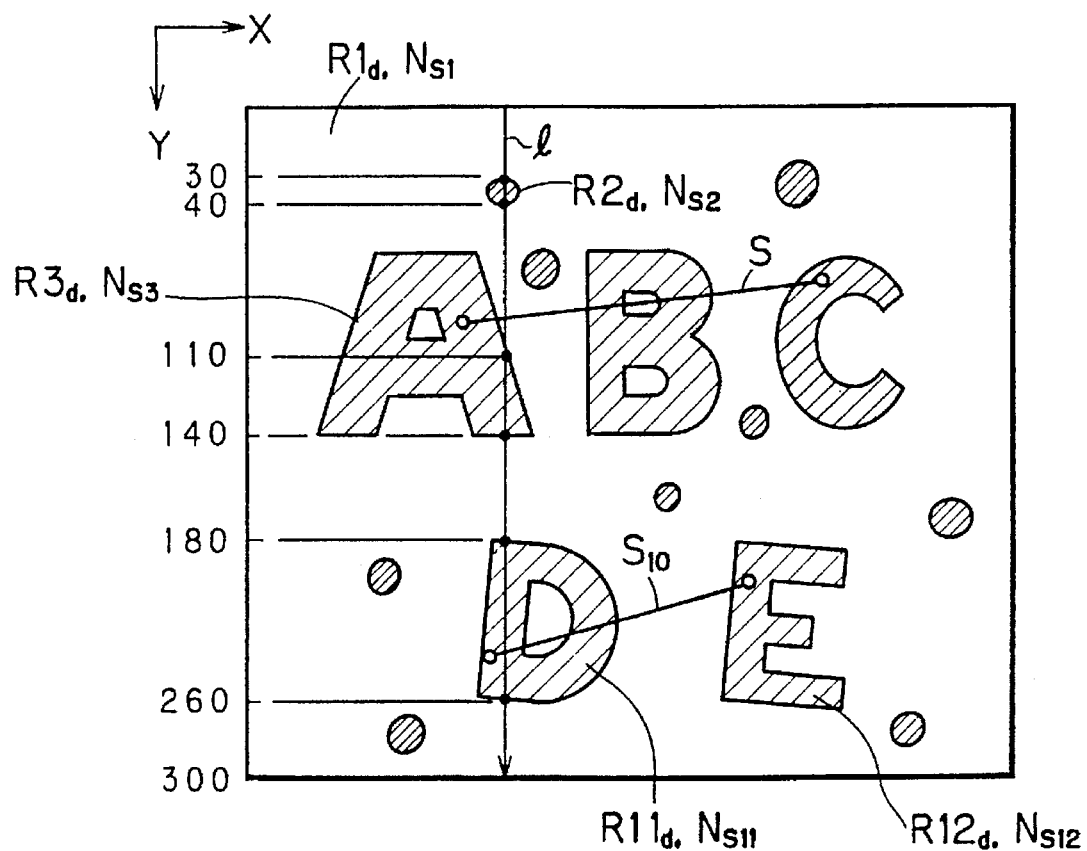
Figure 14B:
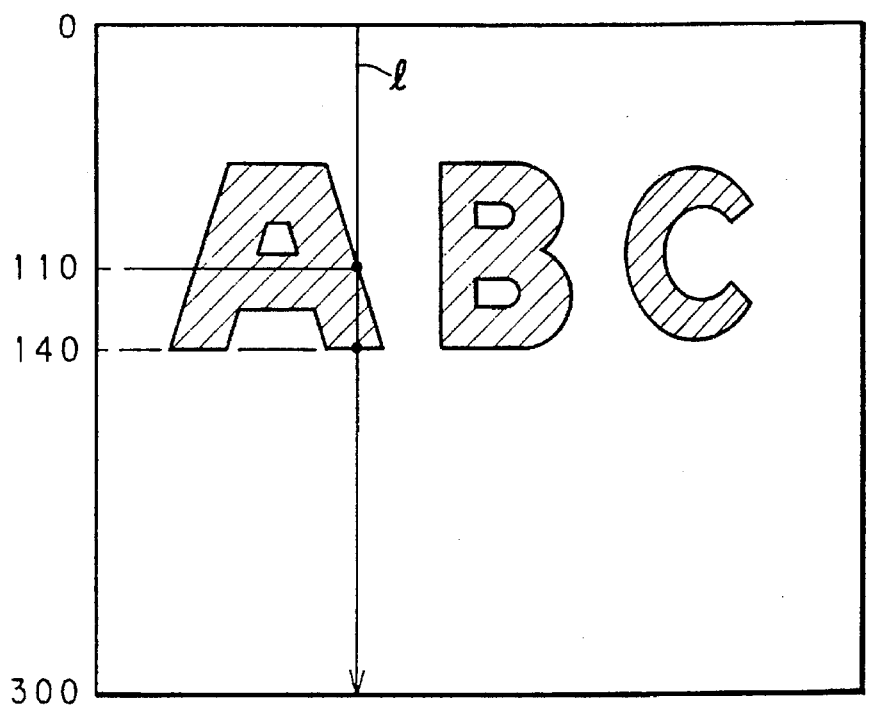

Thus, in the example of FIG. 13B, only the image data for the areas $R3_c$, $R7_c$ and $R14_c$ are extracted and written (in the form of the run length data) into the extracted image memory, so that the extraction processing can be repeated (step S11), the image data existing in the memory 13 before the writing processing is conserved even after the writing processing. For example, the initial layout copy image of FIG. 14A is stored in the image memory 13, and after the first extraction steps S1–S10, the image of FIG. 14B is obtained and stored in the extracted image memory 13. Then, going back to step S5, the extraction of the letters "DE" is instructed by designating another segment $S_{10}$, whereby a final extracted image (FIG. 14C) is obtained.

The following method may be employed to make such repeated writing possible. The run length data for main scanning line 1 on the initial layout copy image (FIG. 4A) is shown in FIG. 14D. Since the main scanning line Z passes through the areas $R1_d$, $R2_d$, $R3_d$ and $R11_d$, the run length data in FIG. 4D contain, as system color data $D_{sc}$, system color numbers $N_{s1}$, $N_{s2}$, $N_{s3}$ and $N_{s11}$ for those areas.

Upon the first extraction of all the areas through which the line 1 passes, only the area $R3_d$ (the letter A) is extracted, and the values of the system color numbers other than the objective system color number $N_{s3}$ and the associated black/white designation data $D_{wb}$ are made the same as the values of the "white" areas $R1_d$ (FIG. 14E). Then, the consecutive unit run length data expressing the white areas (the asterisked unit run length data in FIG. 14E) are united to one unit run length data. This is based on the rule that a unit run length data is deleted if the unit run length data is just subsequent to another unit run length data having the same color. The result is shown in FIG. 14F. The extracted image corresponding to the corrected run length data is written in the extracted image memory 13 as shown in FIG. 14F. The extracted image corresponding to the corrected run length data is written in the extracted image memory 13 as shown in FIG. 14B.

Figure 14C:
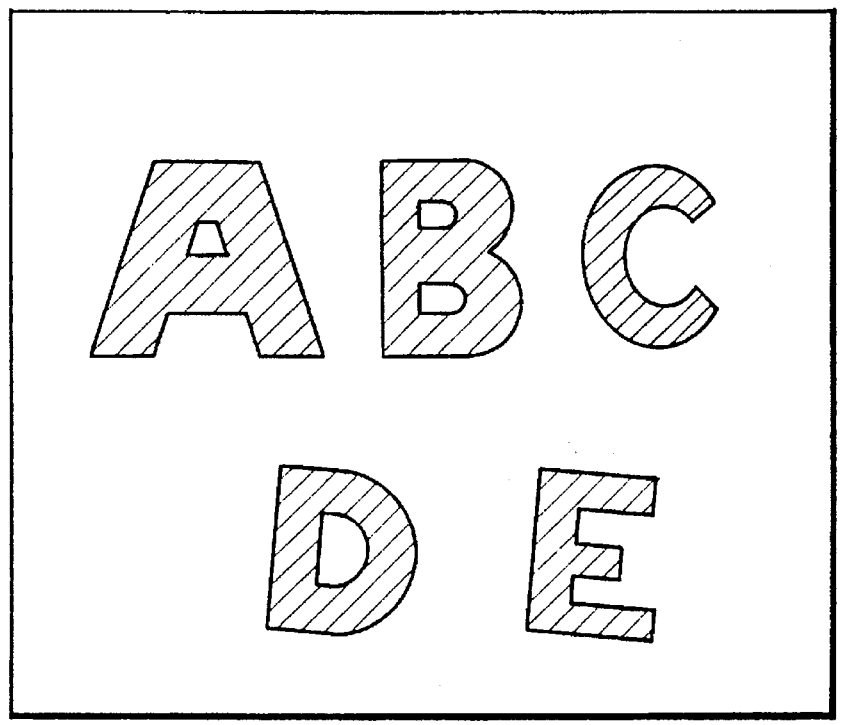

During the second extraction process, i.e., during the extraction of the letters D and E, the run length data on the main scanning line 1 (FIG. 14D) is corrected as shown in FIG. 14G. The first extracted image (a first partial image) (composed of the letters A, B and C) is added to the second extracted image (a second partial image) (composed of the letters D and E). This is carried out only by uniting the run length data in FIGS. 14F and 14G. In particular, this is carried out by only sorting in an ascent order the respective coordinate data $D_{rc}$ included in the two run length data. As a result, the run length data shown in FIG. 14H is obtained. This processing is made along main scanning lines of the respective subscanning coordinates X, where the extracted image shown in FIG. 14C is finally obtained.

As mentioned above, since the image to be extracted is designated by the segment S, the individual pinholes do not have to be deleted one by one. Accordingly, the pinholes can be easily and rapidly removed.

D. Modification and Conclusion (1) The present invention is not limited to coloring and image extraction. For example, areas designated by the segment S can be thickened or thinned by, for example, increasing or decreasing the width of designated areas by a predetermined number of pixels. Suitable thickening and thinning processes are disclosed in Japanese Patent Laying Open Gazette No. 1181279 (1989) and Research Reports No. 835, p. 25–64 from Electrotechnical Laboratories, Ibaragi, Japan (September 1983).

Figure 15:
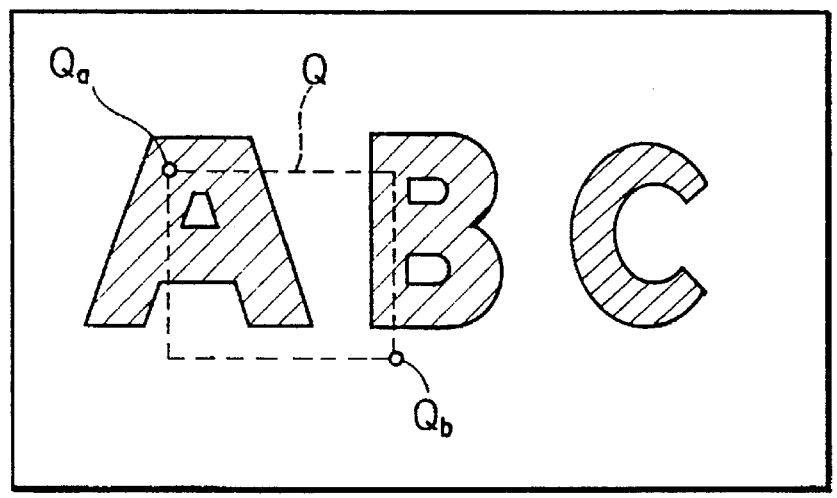
FIG. 15 is a plan view of a rectangular designation graphic.

(2) The objective areas may be designated by a designation graphic other than the segment S. For example, in FIG. 15, a dotted rectangle is used to designate objective areas. An operator only designates the positions of two apexes $Q_a$ and $Q_b$ (on a diagonal of the rectangle Q) on the color monitor 10. The rectangle Q is automatically generated on the color monitor 10 from the positions of the apexes $Q_a$ and $Q_b$. In this case, each area which is at least partially within the rectangle Q, and which has a color which is designated to be objective (for example, black) are specified as designated areas. In FIG. 15, the black areas of the letters A and B are specified as the designated areas.

(3) In the above embodiments, a monochrome layout copy image is divided into black areas and white areas. However, the present invention can be used to rearrange the areas and colors of a chromatic layout copy image.

(4) The divided areas may be provided with respective area codes instead of the color numbers.

(5) The coloring process or the image extraction process may be applied to areas other than the object areas which are designated by the designation graphic (e.g., the designation segment S). The areas to be processed may be switched between the objective areas and the other areas with the mouse 5 and a menu displayed on the color monitor 10. As explained above, according to the present invention, since parts of a plurality of image areas within a given image are simultaneously designated by a designation graphic, many image areas can easily designated, so that the designated areas (or the areas other than the designated areas) can be processed at a high speed.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. A method of processing an image, comprising the steps of:

assigning initial colors to image areas of an image;

generating a table in which the initial colors are registered for the image areas, respectively;

displaying the image and thereby creating a displayed image;

selecting on of the initial colors to thereby determine a selected color;

designating a two-dimensional closed graphic on the displayed image, so that two-dimensional closed graphic intersects with at least one image area having the selected color and encompasses at least part of the at least one image area of the selected color and at least part of an image area not having the selected color;

determining as an objective area any image area having the selected color which intersects with the two-dimensional closed graphic and has points encompassed by the two-dimensional closed graphic; and changing the table so that the initial color of areas-to-be-processed is converted to a designated color, the areas-to-be-processed being: (1) the objective image area or (2) all of the areas of the image other than the objective image area.

2. The method of claim 1, wherein the step of designating the two-dimensional closed graphic includes the step of:

designating a plurality of points; and generating a line which interconnects the points.

3. The method of claim 2, wherein the two-dimensional closed graphic has apexes at the plurality of points.

4. Apparatus for processing an image, comprising means for assigning initial colors to image areas of an image;

means for generating a table in which the initial colors are registered for the image areas, respectively;

means for displaying the image and thereby creating a displayed image;

means for selecting one of the initial colors to thereby determine a selected color;

means for designating a two-dimensional closed graphic on the displayed image, so that two-dimensional closed graphic intersects with at least one image area having the selected color and encompasses at least part of the at least one image area of the selected color and at least part of an image area not having the selected color;

means for determining as an objective area any image area having the selected color which intersects with the two-dimensional closed graphic and has points encompassed by the two-dimensional closed graphic; and means for changing the table so that the initial color of areas-to-be-processed is converted to a designated color, the areas-to-be-processed being: (1) the objective image area or (2) all of the areas of the image other than the objective image area.

5. The apparatus of claim 4, wherein the means for designating a two-dimensional closed graphic includes:

means for designating a plurality of points; and means for generating a line which interconnects the points.

6. The apparatus of claim 5, wherein the two-dimensional closed graphic has apexes at the plurality of points.

* * * * *